United States Patent
Leonardi et al.

(10) Patent No.: US 7,258,183 B2
(45) Date of Patent: Aug. 21, 2007

(54) STABILIZED ELECTRIC DISTRIBUTION SYSTEM FOR USE WITH A VEHICLE HAVING ELECTRIC ASSIST

(75) Inventors: Franco Leonardi, Dearborn Heights, MI (US); David J. Berels, Plymouth, MI (US); John M. Miller, Cedar, MI (US); Ronald D. Brost, Dearborn, MI (US); Steven G. Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 10/605,350

(22) Filed: Sep. 24, 2003

(65) Prior Publication Data

US 2005/0061561 A1 Mar. 24, 2005

(51) Int. Cl.
B60L 11/02 (2006.01)
B60K 6/04 (2006.01)

(52) U.S. Cl. .................... 180/65.1; 180/65.2; 903/930; 903/942; 903/943

(58) Field of Classification Search ............... 180/65.1, 180/65.2, 65.3, 65.4; 701/22; 903/930, 903/942, 943, 948
See application file for complete search history.

(56) References Cited

U.S. PATENT DOCUMENTS

| | | | |
|---|---|---|---|
| 5,285,862 A | 2/1994 | Furutani et al. | |
| 5,318,142 A | 6/1994 | Bates et al. | |
| 5,818,115 A * | 10/1998 | Nagao | 290/31 |
| 5,898,282 A | 4/1999 | Drozdz et al. | |
| 6,223,106 B1 | 4/2001 | Yano et al. | |
| 6,365,983 B1 * | 4/2002 | Masberg et al. | 290/40 C |
| 6,450,274 B1 * | 9/2002 | Konno et al. | 180/65.3 |
| 6,484,830 B1 | 11/2002 | Gruenwald et al. | |
| 6,543,561 B1 * | 4/2003 | Pels et al. | 180/65.2 |
| 6,578,649 B1 * | 6/2003 | Shimasaki et al. | 180/65.2 |
| 2002/0070557 A1 | 6/2002 | Geis | |
| 2002/0113441 A1 | 8/2002 | Obayashi | |

* cited by examiner

Primary Examiner—Frank Vanaman
(74) Attorney, Agent, or Firm—David B. Kelley; Brooks Kushman P.C.

(57) ABSTRACT

A stabilized electric distribution system for use in a vehicle having electric assist. The system electrically couples an electric assist bus to an accessory load bus while protecting the first electrical bus from electric assist and regenerative braking induced voltage variations. An energy management controller selectively controls each of a electric motor/generator, a DC/DC converter, and an alternator to affect electric energy distribution within the system. Preferably, the electric energy distribution is controlled to maintain the first electrical bus voltage within a predefined voltage range.

8 Claims, 2 Drawing Sheets

STABILIZED ELECTRIC DISTRIBUTION SYSTEM FOR USE WITH A VEHICLE HAVING ELECTRIC ASSIST

BACKGROUND OF INVENTION

1. Field of the Invention

The present invention relates to hybrid electric vehicles (HEVs). In particular, the present invention relates to HEVs having an electric assist bus electrically coupled to an accessory load bus.

2. Background Art

A hybrid electric vehicles (HEV) is an example of a vehicle having an electric assist bus and an accessory bus.

The electric assist bus electrically couples an energy source to an electric motor. The electric motor converts electric energy to mechanical energy to provide motoring torque for use in moving the vehicle and converts mechanical energy to electric energy to capture kinetic energy otherwise dissipated during braking. The use of the electric motor to provide motoring torque is commonly referred to as electric assist. The use of the electric motor to provide braking torque is commonly referred to as regenerative braking.

The accessory load bus electrically couples accessory loads to an alternator. The electrical energy provided by the alternator is transferred over the accessory load bus for use by the accessory loads. The accessory loads typically operate best within a predefined voltage range. Accordingly, it is desirable to maintain the accessory load bus within the predefined voltage range.

Electric assist and regenerative braking tends to induce voltage variations on the electric assist bus. Such voltage variations can become problematic if the accessory load bus is electrically coupled to the electric assist bus. In this case the accessory loads may experience the voltage variations and associated malfunctions or other damage.

In the past, the electric assist bus was electrically isolated from the accessory load bus to protect the accessory loads from the induced voltage variations. Electrically isolating the accessory load bus from the electric assist bus has some drawbacks. Namely, systems having such isolated busses tend to be less efficient than systems which electrical couple the busses. As such, there exists a need to electrically couple the accessory load bus to the electric assist bus.

SUMMARY OF INVENTION

The needs identified above are met with a "stabilized" electric distribution system of the present invention. The system electrically couples an electric assist bus to an accessory load bus while protecting the accessory load bus from electric assist and regenerative braking induced voltage variations.

One aspect of the present invention relates to a stabilized electric distribution system for use in a parallel mode hybrid electric vehicle (HEV). The system includes an electric assist bus, an accessory load bus, a DC/DC converter, an energy management controller, an electric motor/generator, an ultracapacitor, a battery, an alternator, an accessory load, and an energy management controller. The ultracapacitor and the electric motor/generator are electrically coupled to the electric assist bus. The alternator, the accessory battery, and the accessory load are electrically coupled to the accessory load bus. The DC/DC converter couples the electric assist bus to the accessory load bus. In this manner, electric energy can flow between the electric assist bus and the accessory load bus. In particular, the coupling of the electric assist bus and the accessory load bus permits electric energy to flow between the electric motor/generator, the ultracapacitor, the battery, the alternator, and the accessory load.

The energy management controller selectively controls each of the electric motor/generator, the DC/DC converter, and the alternator to affect electric energy distribution within the system. Preferably, the electric energy distribution is controlled to maintain the accessory load bus voltage within a predefined voltage range.

DETAILED DESCRIPTION

Figure 1:
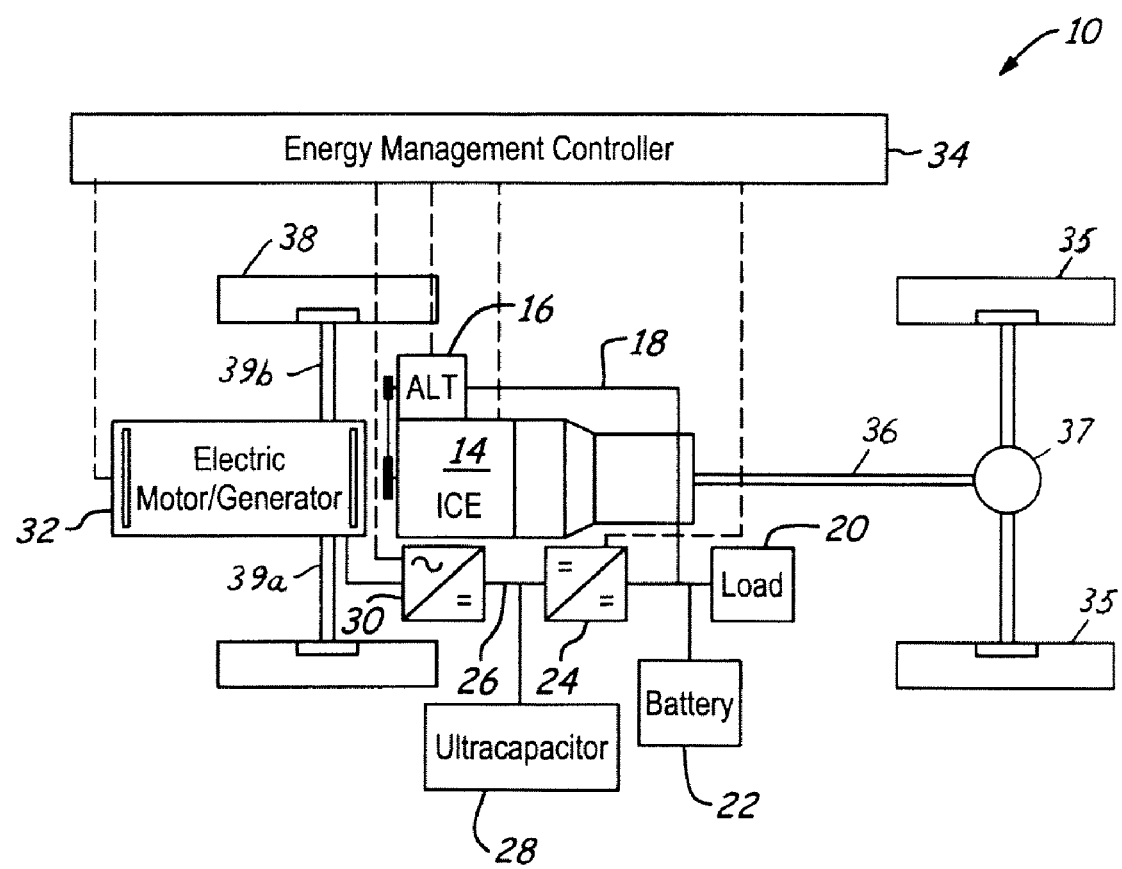
FIG. 1 illustrates a stabilized electric distribution system in accordance with the present invention.

FIG. 1 illustrates a stabilized electric distribution system 10 in accordance with the present invention. The system 10 includes an internal combustion 14, engine (ICE), an alternator 16, an accessory load bus 18, an accessory load 20, a battery 22, a DC/DC converter 24, an electric assist bus 26, an ultracapacitor 28, a DC/AC inverter 30, an electric motor/generator 32, and an energy management controller 36.

The system 10 shown is configured for a parallel mode hybrid electric vehicle (HEV), but it could be similarly configured for series, parallel-series, or hybrid vehicle configurations coupling an accessory load bus to the electric traction assist bus. In addition, the system of FIG. 1 can be adapted for use in front wheel drive, rear wheel drive, and all wheel drive applications.

By way of example, and not limitation, the system of FIG. 1 is shown as a so-called electronic four-wheel drive system. This system drives front wheels 35 with the internal combustion engine 14 providing torque to a front axle 36 and differential gear 37 and drives rear wheels 38 with electric traction assist provided by the electric motor/generator 32 providing torque to rear axle portions 39a and 39b. Although not shown, the system could have multiple electric motor/generators, for example, on each of the axles or wheels. Moreover, the present invention is not limited to any particular configuration, and in particular, the system could be reversed such that the internal combustion engine could be used to drive the rear wheels 38 with the electric traction assist provided to the front wheels 35.

The accessory load bus 18 electrically couples together the alternator 16, the accessory load 20, and the battery 22 to permit the flow of electric energy therebetween. The electric assist bus 26 electrical couples together the electric motor/generator 32, the DC/AC inverter 30, and the ultracapacitor 28 to permit the flow or electric energy therebetween. The DC/DC converter 24 provides the final linking to electrically couple the electric assist bus 26 to the accessory load bus 18 to permit the flow of electric energy therebetween. In this manner, the system 10 can distribute electric energy to each of the DC/AC inverter 30, the electric motor/generator 32, the ultracapacitor 28, the battery 22, and the accessory load 20.

As shown, only one accessory load 20 is coupled to the accessory load bus 18, but any one or more of an air conditioning module, a radio module, a lighting module, or other electric module could be coupled to the accessory load bus. The accessory load 20, whether it be anyone of the modules list above or some other module, tends to require a relatively narrow operating voltage range. The relatively narrow operating voltage range makes it desirable to maintain the accessory load bus 18 within a predefined voltage range, typically 40 to 45 volts. Preferably, the predefined voltage range corresponds with the operating voltage range of the accessory load 20.

Figure 2:
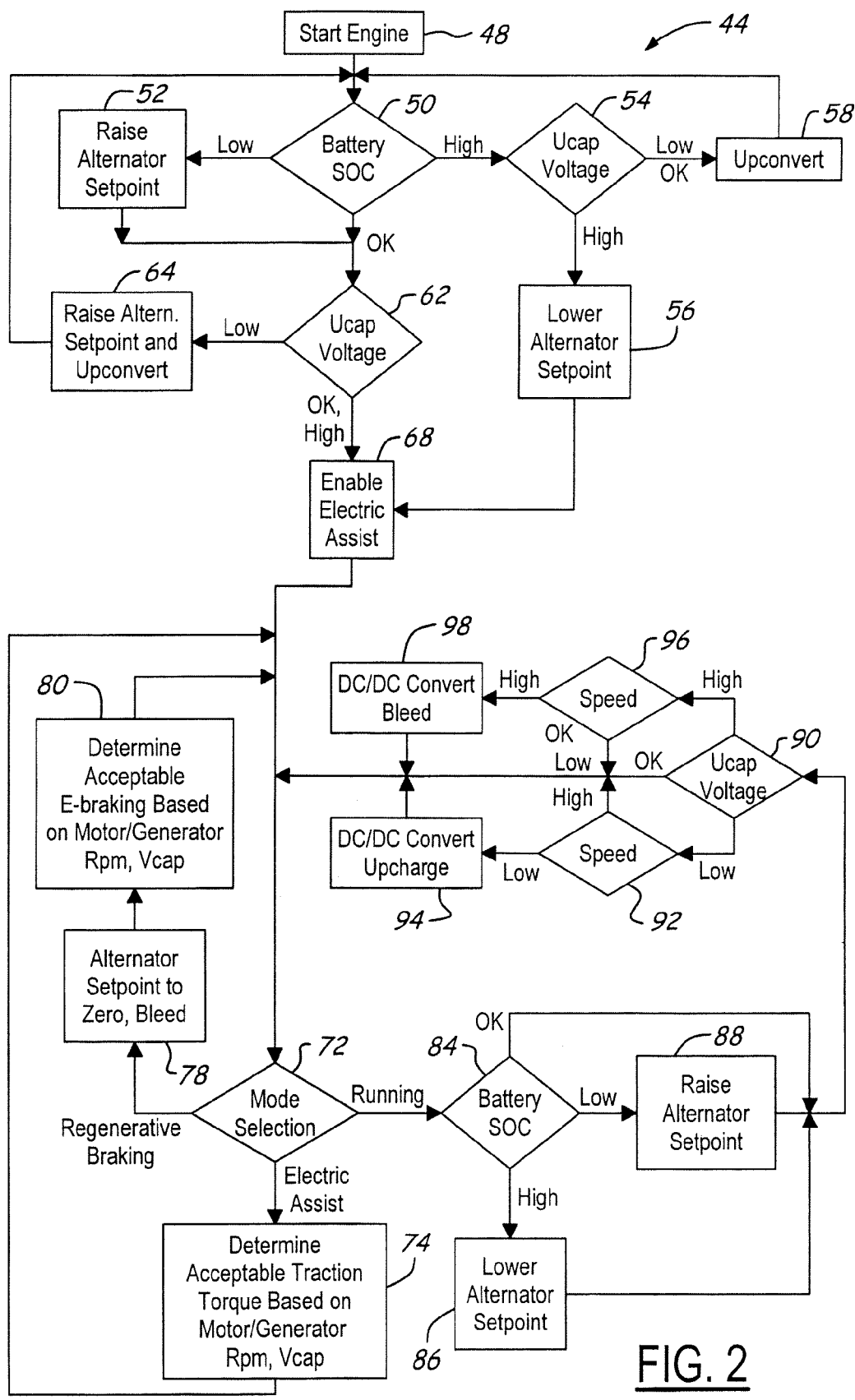
FIG. 2 illustrates an energy management method to maintain an accessory load bus within a predefined voltage range in accordance with the present invention.

FIG. 2 illustrates an energy management method 44 in accordance with the present invention. The energy management method 44 is executed by the energy management control 36 to distribute electric energy throughout the system in such a manner that the accessory load bus 18 is maintained within the predefine voltage range. Preferably, the accessory load bus voltage is maintained within the predefined voltage range throughout all HEV driving conditions.

The method 44 includes four general energy management modes, a start-up mode, a regenerative braking mode, an electric assist mode, and a running mode. The energy management controller 36 switches between each of these modes depending on the HEV driving conditions.

Start-up mode begins with step 48. Step 48 starts with turning the ignition key to an "on" position. The energy management controller 36 typically begins in the start-up mode. The start-up establishes an initial accessory load bus voltage.

A step 50 occurs once the HEV is started. Step 50 sets a battery state of charge. Step 50 includes checking the battery state of charge and determining whether the state of charge is "low," "ok," or "high." The preferred battery state of charge range is 60-70%, however, this value typically varies according to the type of battery and the use of the accessory load bus. "Low" corresponds with a state of charge less than the preferred battery state of charge range. "Ok" corresponds with a battery state of charge within the preferred battery state of charge range. The battery state of charge is maintained if the battery state of charge is determined by step to be "ok." "High" corresponds with a battery state of charge greater than the preferred battery state of charge range. Preferably, the battery 22 operates within the preferred state of charge range. The preferred state of charge range is a predefined range in which the battery needs to remain to achieve its desired life span while maintaining acceptable vehicle performance.

A step 52 raises an alternator set-point if the battery state of charge is "low." The set-point refers to a logic command received by the alternator which can be used to controllably raising or lower the voltage produced by the alternator, i.e., the alternator set-point. Increasing the set-point increases the alternator voltage to increase the amount of current flowing into the battery and consequently the battery state of charge.

A step 54 checks an ultracapacitor voltage if the battery state of charge is "high." The step 54 includes checking the ultracapacitor voltage and determining whether the ultracapacitor voltage is "low," "ok," or "high." The preferred ultracapacitor voltage range is 30-50 volts, however, this value typically varies according to the type of ultracapacitor and the use of the electric assist bus. Like the battery, "low" corresponds with a ultracapacitor voltage less than the preferred ultracapacitor voltage range. "Ok" corresponds with a ultracapacitor voltage within the preferred ultracapacitor voltage range. The ultracapacitor voltage is maintained if the ultracapacitor voltage is determined by step to be "ok." "High" corresponds with a ultracapacitor voltage greater than the preferred ultracapacitor voltage range. Unlike the battery, the ultracapacitor operates within the entire preferred ultracapacitor voltage range without detrimental effect on its predicted life.

However, if the ultracapacitor state of charge is "low" the ultracapacitor cannot provide acceptable electric assist set according to design specifications.

A step 56 decreases the alternator set-point if the ultracapacitor voltage checked in step 54 is greater than the preferred ultracapacitor voltage range. The lowering of the alternator set point decreases the alternator voltage to prevent further charging of the battery and the ultracapacitor.

A step 58 commands the DC/DC converter to upconvert, i.e. to transfer charge from the battery 22 to decrease the battery state of charge if the ultracapacitor voltage checked in step 54 is less than or within the predefined ultracapacitor voltage range. To upconvert, the DC/DC converter 24 is controlled to permit electric energy to flow from the accessory load bus 18 (or more particularly the battery 22) to the electric assist bus 26.

A step 62 checks the ultracapacitor voltage if the battery state of charge is "ok." Step 62 signifies the completion of steps 50-58 and that the battery state of charge is "ok."

A step 64 raises the alternator set-point if the ultracapacitor voltage is "low." The raised alternator set-point increases the alternator voltage to produce more electric energy. At the same time, the DC/DC converter 64 permits the electric energy to flow from the accessory load bus 18 to the electric assist bus 26 to charge the ultracapacitor. The ultracapacitor voltage increases with the increase of alternator voltage. The method 44 doublechecks the battery state of charge by repeating steps 50-56.

A step 68 enables electric assist if the ultracapacitor voltage is "ok" or "high." Optionally, the HEV may be prohibited from moving until electric assist is enabled. Accordingly, it is preferably to conduct steps 48-68 as quickly as possible to limit the time the HEV must remain idle prior to driving. Enablement of electric assist indicates the ultracapacitor 38, the battery 22, and the alternator 16 are properly set to establish the accessory load bus voltage within the desired predefined voltage range. The driving operation of the HEV determines the next action taken by the energy management controller.

A step 72 determines which energy management mode to enter based on commands from a vehicle system controller (not shown). Once electric assist is enabled, the energy management controller 36 can operate in anyone of the regenerative braking mode, the electric assist mode, and the running mode. The energy management controller switches between each of these modes depending on the HEV driving conditions. Each of the modes maintains the accessory load bus voltage within the predefined voltage range.

A step 74 initiates electric assist mode if electric assist is requested of step 72. Electric assist can be requested directly by the driver, for example, via an accelerator pedal, or autonomously by a vehicle system controller or other suitable means. The electric assist request prompts the energy management controller 36 to determine the torque available for electric assist. The energy management controller then instructs the electric motor/generator 36 to consume electric energy to produce the torque. The electric energy management controller can be implemented as part of a vehicles system controller or separately as a physical or logical unit.

The control of the electric motor/generator can continue with the energy management controller 36, a vehicle system controller, or an electric motor/generator controller. In some cases, the energy management controller 36 determines an available torque and another controller, such as the vehicle system controller, coordinates the available electric assist torque with other vehicle operating parameters to control torque production.

The available electric assist torque corresponds with the amount of torque the electric motor/generator can produce. More specifically, the available electric assist torque is a function of an electric motor/generator speed (rpm) and the ultracapacitor voltage (vcap). The electric motor/generator 32 can provide torque as long as electric energy flows to the electric motor/generator 32.

The accessory load bus voltage 18 is maintained within the predefined voltage range during electric assist. The DC/DC converter 24 prevents electric energy to flow from the accessory load bus 18 to the electric assist bus 26. As such, the accessory load bus voltage is maintained. The accessory load 20 can consume electric energy during electric assist, in which case, the alternator 16 and the battery 22 can provide the necessary electric energy to maintain the accessory load bus voltage within the predefined voltage range.

Optionally, an aspect of the HEV may be that electric assist is always available. This is common on all-wheel drive HEVs, especially of the type wherein the electric assist provides torque to wheels which are isolated from the internal combustion engine, i.e., electric assist drives the front wheels and the internal combustion engine drives the rear wheels. Such full-time electric assist can require the DC/DC converter 24 to permit energy flow between the electric assist bus 22 and the accessory load bus 18 if the ultracapacitor 28 becomes drained during electric assist. In this case the energy management controller 36 controls the DC/DC converter 24 to permit energy flow to the electric motor/generator 32. The energy flow can come from one of or both the battery 22 and the alternator 16.

The energy management controller 36 exists electric assist mode and returns to step 72 if the electric assist torque request ceases or the electric motor/generator 32 is unable to provide further electric assist. Other conditions can also force exiting of electric assist mode, such as a fault condition. A step 78 initiates regenerative braking mode if step 72 determines a request for regenerative braking is received. The regenerative braking request typically originates from the vehicle system controller.

Step 78 sets an alternator set-point to zero. The zero set-point forces the alternator voltage to zero to stop the alternator from transferring electric energy to the accessory load bus. Regenerative braking adds electric energy to the system. As such, the added energy eliminates the need to consume the fuel used by the alternator. However, even during regenerative braking, the accessory load bus voltage 18 must still be maintained within the predefined voltage range and the accessory load 20 must still receive a sufficiently stable supply of electric energy.

Step 78 maintains the accessory load bus 18 within the predefined voltage range by allowing energy flow from the electric assist bus 26 to the accessory load bus 18 through the DC/DC converter 28. The DC/DC converter voltage is set at a first DC/DC converter voltage to supply energy to the accessory load if the battery 18 is sufficiently charged. The DC/DC converter 24 is set at a second DC/DC converter voltage to recharge the battery electrically and to supply energy to the accessory load. The second DC/DC converter voltage is greater than the first DC/DC converter voltage.

A step 80 determines acceptable regenerative braking parameters. The parameters are based upon the speed of the electric motor/generator and the ultracapacitor voltage. Step 80 keeps regenerative braking at its maximum allowable level preferably until the ultracapacitor is fully charged. Once the ultracapacitor 30 has reached its maximum allowable voltage the braking torque is reduced to a level that matches the amount that can be absorbed by the accessory loads 18 through the DC/DC converter 24.

Finally, energy management controller 36 exits regenerative braking mode and returns to step 72 at the competition of regenerative braking. The completion of regenerative braking can correspond with the determinations made in step 80 or with a need to provide electric assist.

Step 72 initiates running mode if step 72 determines there are no requests for regenerative braking and electric assist. In other words, running mode corresponds with the absence of a torque request, i.e. the absence of the negative torque request of regenerative braking and the absence of the positive torque request of electric assist.

The running mode corresponds with the HEV being driven in a relatively steady-state. Preferably, the running mode provides an opportunity to position the system to maximize regenerative braking energy or electric power assist. The running mode is typically active most of the time because it corresponds to cruising or mild acceleration conditions. Running mode is similar to start-up mode in that the general object of both modes is to establish the accessory load bus voltage within the predefined voltage range and to tune the alternator 16, the battery 32, and the ultracapacitor accordingly 28.

A step 84 sets the battery state of charge. A step 86 lowers the alternator set-point to decrease the alternator voltage to prevent further charging of the battery if the battery state of charge is "high." A step 88 raises the alternator set-point to increase the alternator voltage to provide additional charging of the battery if the battery state of charge is "low." A step 90 checks the ultracapacitor voltage if the alternator set-point is adjusted in steps 86-88 or if step 84 determines the battery state of charge is "ok." A step 92 checks the speed of the HEV if step 90 determines the ultracapacitor voltage to be "low." The speed check determines whether a regenerative braking event is likely to occur. The need to provide electric assist under all driving conditions requires the ultracapacitor voltage to be available whenever possible. As such, the "low" ultracapacitor should be charged if a regenerative braking event is unlikely. Otherwise, electric assist may be unavailable.

A step 94 upcharges using one or both of the battery 22 and the alternator 16 if step 92 determine a "low" speed. Step 94 provides additional energy to the ultracapacitor 28 to increase the ultracapacitor voltage. To upcharge, the energy management controller 36 controls the DC/DC converter 24 to permit energy to flow from the accessory load bus 18 to the electric assist bus 26. The alternator voltage is controller to ensure that during this charge of the ultracapacitor the first electrical bus voltage remains within the predefined voltage range.

Alternatively, the energy management controller exits running mode if step 92 determines the vehicle speed is "high." The "high" vehicle speed indicates a regenerative braking opportunity is possible. The energy management controller returns to step 72 to continue running mode or to conduct regenerative braking if such a request is received.

A step 96 checks the speed of the HEV if step 90 determines the ultracapacitor voltage to be "high." A "high" speed indicates a regenerative braking event is likely to occur. The "high" ultracapacitor voltage indicates the ultracapacitor has excess energy to provide to the accessory load bus 18. The excess energy can be used to charge the battery 22 and to power the accessory load 20. Advantageously, fuel consumption can be decreased in this manner. However, it may be undesirable to do so if the ultracapacitor is not likely to be charged through regenerative braking.

A step 98 bleeds the ultracapacitor if step 96 determines the HEV speed to be "high." Step 98 supplies energy from the ultracapacitor to the accessory load bus 18 with the anticipation of recharging the ultracapacitor in the near future. Accordingly, the energy management controller 36 controls the DC/DC converter 24 to permit electric energy to flow from the electric assist bus 26 to the accessory load bus 18 at the expense of decreasing the ultracapacitor voltage.

Alternatively, the energy management controller 36 exists running mode if step 96 determines the vehicle speed is "low" or "ok." The "low" or "ok" vehicle speed indicates a braking event may be unavailable. As such, the need to provide electric assist under all driving conditions prevents bleeding the ultracapacitor 28. Without the anticipation of recharging the ultracapacitor 28 it is desirable to keep the ultracapacitor 28 charge so that electric assist availability can be maintained.

Throughout each operating mode, the energy management controller 36 is able to execute each step in a relatively rapid manner. As such, the raising and lower of the alternator set-point, the bleeding of the ultracapacitor, or the upcharging of one or more of the battery and the ultracapacitor, is relatively instantaneous. The increase or decrease in energy resulting from one of these actions is then checked with continued execution of one or more of the above steps. Accordingly, the system 10 continuously monitors electric energy flow to maintain the accessory load bus voltage, but also to take advantage of the electrically coupled bus to pass electrical energy therebetween such that fuel efficiency and the availability of electric assist is maximized.

The battery 22 and the ultracapacitor are passive devices. As such, the energy management controller can only control one or more of the DC/DC converter 22, the electric motor/generator 32, and the alternator 16 to manage the energy flow in the system 10. Alternatively, however, the motor/generator 32 can be controlled by means of the DC/AC inverter 30.

The electric coupling of the electric assist bus 26 to the accessory load bus 18 by way of the DC/DC converter 24, especially when taken in combinations with the forgoing energy management control method 44, provides a novel and stabilized electric distribution system 10. The present invention is particularly advantageous in parallel mode HEVs having the electric assist bus electrically coupled to the accessory load bus.

While the best mode for carrying out the invention has been described in detail, those familiar with the art to which this invention relates will recognize various alternative designs and embodiments for practicing the invention as defined by the following claims.

The invention claimed is:

1. A method for operating a vehicle having a first electrical bus for providing power to accessory loads and a second electrical bus electrically coupled to the first electrical bus, the second electrical bus including an ultracapacitor and at least one electric motor/generator for providing electric motor traction assist to wheels of the vehicle, the method comprising:
providing electric motor assist by powering the electric motor/generator with energy from the ultracapacitor;
regulating a voltage of the first electrical bus within a predefined voltage range while the electric motor provides the electric motor traction assist;
wherein regulating the first electrical bus within the predefined voltage range includes controlling a DC/DC converter electrically coupled between the first and second electrical buses to prevent electric energy to flow from the second to the first bus during the electric motor traction assist; and
providing energy from the first to the second electrical bus if an ultracapacitor voltage of the ultracapacitor is below a predefined voltage limit by controlling the DC/DC converter such that electric energy flows from the first to the second electric bus while still regulating the first electric bus within the predefined voltage range, the electric motor traction assist provided based on the electric energy flow from the first to the second electric bus.

2. The method of claim 1, further comprising permitting energy to flow from a battery electrically coupled to the first electrical bus to the second electrical bus to permit the electric energy to flow from the first to the second electric bus.

3. The method of claim 2, further comprising controlling an alternator set-point to increase energy flow to the first electrical bus from an alternator electrically coupled to the first electrical bus based on the energy flow from the battery to the second electric bus if the battery voltage of the battery is below a predefined battery voltage range.

4. The method of claim 2, further comprising regeneratively braking the electric motor/generator for charging the ultracapacitor and for providing energy to the first electrical bus by regulating the flow of energy from the second to the first electrical bus while still regulating the first electric bus within the predefined voltage range by controlling energy flow through the DC/DC converter.

5. The method of claim 4, further comprising lowering an alternator set-point based on the energy flow produced by the regenerative braking to limit energy provided by the alternator to the first electrical bus for regulating the first electric bus within the predefined voltage range.

6. The method of claim 1, wherein regulating the voltage of the first electrical bus includes executing a start-up energy management mode.

7. The method of claim 1, wherein regulating the voltage of the first electrical bus includes executing an electric traction assist energy management mode.

8. The method of claim 1, wherein regulating the voltage of the first electrical bus includes executing a running energy management mode.

* * * * *